US012567181B2

(12) United States Patent (10) Patent No.: US 12,567,181 B2
Fouts et al. (45) Date of Patent: Mar. 3, 2026

(54) SYSTEMS AND METHODS FOR REAL-TIME PROCESSING OF MEDICAL IMAGING DATA UTILIZING AN EXTERNAL PROCESSING DEVICE

(71) Applicant: Stryker Corporation, Kalamazoo, MI (US)

(72) Inventors: Brian Fouts, Morgan Hill, CA (US); Marc André, Spiegel b. Bern (CH); Christopher Robert Miller, Denver, CO (US)

(73) Assignee: Stryker Corporation, Portage, MI (US)

( * ) Notice: Subject to any disclaimer, the term of this patent is extended or adjusted under 35 U.S.C. 154(b) by 122 days.

(21) Appl. No.: 18/359,815

(22) Filed: Jul. 26, 2023

(65) Prior Publication Data

US 2024/0037808 A1 Feb. 1, 2024

Related U.S. Application Data

(60) Provisional application No. 63/369,654, filed on Jul. 27, 2022.

(51) Int. Cl.
*G06T 11/00* (2006.01)
*H04N 5/265* (2006.01)

(52) U.S. Cl.
CPC ............. *G06T 11/00* (2013.01); *H04N 5/265* (2013.01)

(58) Field of Classification Search
CPC ................................ G06T 11/00; H04N 5/265
See application file for complete search history.

(56) References Cited

U.S. PATENT DOCUMENTS 8,175,379 B2 5/2012 Wang
10,600,183 B2 3/2020 Barral
(Continued)

FOREIGN PATENT DOCUMENTS

EP 3852009 A1 7/2021
JP 5931755 5/2016

OTHER PUBLICATIONS

Datapath. (2022) "VisionIO-XD2," located at https://www.medtronic.com/covidien/en-us/products/touch-surgery.html, 5 pages.
International Search Report and Written Opinion mailed Jan. 9, 2024, directed to International Application No. PCT/US2011/071051; 19 pages.
(Continued)

*Primary Examiner* — Kee M Tung
*Assistant Examiner* — Khoa Vu
(74) *Attorney, Agent, or Firm* — Morrison & Foerster LLP

(57) ABSTRACT

The present disclosure relates to system architectures for real-time processing and displaying of medical imaging data with no or reduced latency. An exemplary system for generating a video of a surgery can comprise: a processor configured to execute a plurality of instructions for a machine-learning model stored on a memory and a programmable circuit communicatively coupled with the processor. The programmable circuit is programmed to: receive surgical video data comprising a current frame; provide data related to the current frame to the processor; receive overlay data generated by the machine-learning model based on a previous frame captured before the current frame; generate, by a mixer of the programmable circuit, a composite frame based on the current frame and the overlay data; and output the composite frame for display as a part of the video of the surgery.

35 Claims, 6 Drawing Sheets

(56)     References Cited

U.S. PATENT DOCUMENTS

| | | | |
|---|---|---|---|
| 2006/0176308 A1* | 8/2006 | Karandikar | G06F 9/3888 |
| | | | 345/501 |
| 2017/0064309 A1* | 3/2017 | Sethuraman | H04N 19/577 |
| 2020/0367974 A1* | 11/2020 | Khalid | A61B 34/20 |
| 2021/0153735 A1* | 5/2021 | Tsukada | G16H 50/50 |
| 2021/0319894 A1* | 10/2021 | Sobol | G16H 20/30 |
| 2023/0266872 A1* | 8/2023 | Kennedy | G16H 40/67 |
| | | | 348/47 |
| 2024/0055088 A1* | 2/2024 | Wolf | A61B 17/00 |
| 2024/0156547 A1* | 5/2024 | Luengo Muntion | G06V 20/41 |
| 2024/0206989 A1* | 6/2024 | Luengo Muntion | G06N 3/045 |
| 2024/0395287 A1* | 11/2024 | Gras | G06T 11/60 |

OTHER PUBLICATIONS

Invitation to Pay Additional Fees, and where applicable, protest fee mailed Nov. 7, 2023, directed to International Application No. PCT/US2011/071051; 12 pages.
Medtronic. (2022) "GI Genius Intelligent Endoscopy Module," located at https://www.medtronic.com/covidien/en-us/products/gastrointestinal-artificial-intelligence/gi-genius-intelligent-endoscopy.html, 7 pages.
Medtronic. (2022) "Touch Surgery," located athttps://www.medtronic.com/covidien/en-us/products/digital-surgery.html, 6 pages.
International Preliminary Report on Patentability dated Jan. 28, 2025, directed to International Application No. PCT/US2023/071051; 12 pages.

* cited by examiner

*t' is before t*

SYSTEMS AND METHODS FOR REAL-TIME PROCESSING OF MEDICAL IMAGING DATA UTILIZING AN EXTERNAL PROCESSING DEVICE

CROSS-REFERENCE TO RELATED APPLICATIONS

This application claims the benefit of U.S. Provisional Application 63/369,654 filed on Jul. 27, 2022, the entire contents of which are incorporated herein by reference for all purposes.

FIELD

The present disclosure relates generally to processing and displaying of medical imaging data, and more specifically to system architectures for real-time processing and displaying of medical imaging data with no or reduced latency.

BACKGROUND

It is desirable for medical imaging systems (e.g., endoscopes, fluoroscopes, surgical microscopes and exoscopes, PTZ room cameras, boom light cameras) to capture imaging data and provide the imaging data for display with no or minimal latency. For example, medical imaging may involve the insertion of a high-definition camera coupled to an endoscope into a patient to provide a surgeon with a clear and precise view within the patient's body. In many instances, the imaging data (e.g., video stream) collected at the camera may be transmitted to a display device, which renders the imaging data on a display such that the surgeon can visualize the internal area of the body. In many instances, the camera serves as the eyes of the surgeon during the surgery because the camera may provide the only view of the internal area of the patient. Because of this critical function served by the medical imaging device, the system that transfers the imaging data collected by the camera to a display for viewing by the surgeon needs to process the imaging data with little to no latency. Any significant delay between when an event occurs and when that event is displayed to the surgeon could lead to an unsafe operating environment and poor usability. For example, if the latency of the system is significant, the actions the surgeon is taking during the surgery may not be reflected in what the surgeon is seeing on the screen.

Post-capture processing of imaging data may improve how the imaging data is displayed to the surgeon. For example, the imaging data may be modified or augmented to improve the appearance and the interpretability of the imaging data. In particular, machine learning algorithms can be used to identify objects or artifacts in the imaging data, segment image data, and/or augment the imaging data. However, current system architectures for processing medical imaging data do not allow for the full use of available image processing techniques because employing such techniques on existing architectures would lead to unacceptable latency between the collection of imaging data and its display. For example, current system architectures may rely on the same processing system (e.g., a graphical processing unit or GPU) to process each image frame using one or more machine-learning models to obtain overlay data, mix the image frame and the overlay data, and output the mixed data. Execution of the machine-learning models, which is in the critical path between receiving an image frame and displaying the enhanced image frame, can add significant latency (e.g., over 4 frames of latency). Such latency is not acceptable for medical imaging applications especially those used in the surgical context, which typically require the latency of the total system (including other components such as transport/routing, recording, etc.) to be less than 100 ms.

SUMMARY

Disclosed herein are exemplary devices, apparatuses, systems, methods, and non-transitory storage media for processing and displaying medical imaging data. Examples of the present disclosure include computing and processing system architectures for real-time processing and displaying of medical imaging data (e.g., endoscopy and/or fluorescence imaging) that provide robust processing capabilities while also minimizing system latency to ensure that any processing does not lead to significant time lag between the collection of the imaging data and the display of the data. An exemplary system for generating a video of a surgery can comprise: a processor configured to execute a plurality of instructions for a machine-learning model stored on a memory and a programmable circuit communicatively coupled with the processor. The programmable circuit is programmed to: receive surgical video data comprising a current frame; provide data related to the current frame to the processor; receive overlay data generated by the machine-learning model based on a previous frame captured before the current frame; generate, by a mixer of the programmable circuit, a composite frame based on the current frame and the overlay data; and output the composite frame for display as a part of the video of the surgery.

Examples of the present disclosure may introduce no or minimal latency between receiving an input image frame and outputting the machine-learning-based enhanced image frame for display. For a given image frame, the programmable circuit can mix the given image frame with overlay data with no or minimal latency because the overlay data (albeit generated based on a previous image frame) is already available for mixing with the given image frame as soon as the given image frame (or a few lines of the image frame) arrives at the mixer. Thus, the execution of the machine-learning models to process the given image frame, or any image frame or that matter, is no longer in the critical path between the collection of the given image frame and the AI enhancement of the given image frame. In some examples, the latency between receiving an input image frame and outputting a composite image of the input frame and overlay data is less than a full image frame. In some examples, the latency between receiving an input image frame and outputting the composite image of the input frame and overlay data is less than half a full image frame. The latency may be due to the management and adaption of different clocks at the various components of the system, but not due to the execution of machine-learning models. Accordingly, examples of the present disclosure can provide a significant improvement over current medical imaging processing systems by increasing the real-time processing capabilities of medical imaging data (e.g., by adding advanced artificial intelligence (AI) processing power to the surgical video workflow) while minimizing latency.

While some examples of the present disclosure involve execution of machine-learning models, it should be appreciated the techniques described herein can allow processing of imaging data by any type of imaging processing algorithms without introducing significant latency between the collection of the imaging data and the display of such data.

According to an aspect, a system for generating a video of a surgery includes a processor configured to execute a plurality of instructions for a machine-learning model stored on a memory; a programmable circuit communicatively coupled with the processor, wherein the programmable circuit is programmed to: receive surgical video data comprising a current frame; provide data related to the current frame to the processor; receive overlay data generated by the machine-learning model based on a previous frame captured before the current frame; generate, by a mixer of the programmable circuit, a composite frame based on the current frame and the overlay data; and output the composite frame for display as a part of the video of the surgery.

Optionally, the programmable circuit comprises a field programmable gate array ("FPGA").

Optionally, the processor comprises a graphics processing unit ("GPU"), a central processing unit ("CPU"), an AI inferencing unit, or any combination thereof.

Optionally, the system is associated with an operating room. Optionally, the surgical video data is captured by a camera in the operating room. Optionally, the camera in the operating room is an endoscopic camera, a PTZ camera, an exoscope camera, a boom light camera, a fluoroscope camera, or a microscope camera.

Optionally, the machine-learning model is configured to identify one or more objects of interest in an input frame and output one or more graphical overlays indicating the one or more objects of interest.

Optionally, the machine-learning model is configured to identify a measurement associated with two points of interest in an input frame and output a numeric overlay indicating the measurement.

Optionally, the machine-learning model is configured to identify a medical recommendation based on an input frame and output a textual overlay indicating the recommendation.

Optionally, the programmable circuit is configured to: after receiving the current frame, generate, using a splitter of the programmable circuit, a copy of the current frame.

Optionally, the programmable circuit is further configured to: perform one or more preprocessing operations on the copy of the current frame to obtain the data provided to the processor.

Optionally, the one or more preprocessing operations comprise resizing the current frame.

Optionally, the one or more preprocessing operations comprise cropping the current frame.

Optionally, the one or more preprocessing operations comprise changing color of the current frame. Optionally, changing the color of the current frame comprises converting the current frame to a different color space.

Optionally, the one or more preprocessing operations comprise generating an algebraic object based on the current frame. Optionally, the algebraic object comprises a Tensor object.

Optionally, the one or more preprocessing operations comprise normalizing the current frame.

Optionally, the programmable circuit is further configured to: upon receiving the current frame, if no overlay data is available for the mixer to generate the composite frame, output the current frame for display.

Optionally, the overlay data is associated with a predefined display location, wherein the system is further configured to: determine a new display location for the overlay data based on the surgical video data; and generate the composite frame by adding the overlay data to the current frame based on the new display location. Optionally, the programmable circuit is further configured to: if a difference between the predefined display location and the new display location exceeds a threshold, forego generating the composite frame.

Optionally, the programmable circuit is further configured to: upon receiving the current frame, if no overlay data is available for the mixer to generate the composite frame: generate a projected overlay based on one or more previous overlays; and generate, by the mixer of the programmable circuit, the composite frame based on the current frame and the projected overlay.

Optionally, the system comprises a direct memory access ("DMA") controller configured to request data from a memory associated with the processor.

Optionally, the DMA controller is configured to transfer the requested data received from the memory associated with the processor to a video scan-out format. Optionally, the video scan-out format comprises the High-Definition Multimedia Interface ("HDMI"), the DisplayPort interface, the serial digital interface ("SDI"), or any combination thereof.

Optionally, the DMA controller is configured to request the data from the memory associated with the processor as needed without buffering more than ¼ of a full frame.

Optionally, the programmable circuit comprises a DMA controller configured to request the overlay data from a memory associated with the processor.

Optionally, the DMA controller is configured to transfer the overlay data received from the memory associated with the processor to the mixer. Optionally, the mixer is configured to receive the overlay data from the DMA controller and combine the received overlay data with the current frame to generate the composite frame.

Optionally, the DMA controller is configured to request the overlay data from the memory associated with the processor as needed without buffering more than ¼ of a full frame.

Optionally, the mixer is configured to request, from the DMA controller, a pixel of the overlay data before receiving a corresponding pixel in the current frame.

Optionally, the processor is further configured to: provide an input frame to the machine-learning model to obtain an output overlay; and provide the output overlay to the programmable circuit.

Optionally, the system is configured to: receive a first request associated with a first application to execute the machine-learning model to process an input frame; execute, by the processor, the machine-learning model to obtain an output based on the input frame; receive a second request associated with a second application to execute the machine-learning model to process the input frame; upon determining that the first request and the second request are directed to the same machine-learning model, forego re-executing the machine-learning model by the processor based on the second request.

Optionally, the machine-learning model is associated with a unique identifier.

According to an aspect, an exemplary method for generating a video of a surgery comprises: receiving, by a programmable circuit, surgical video data comprising a current frame; providing, by the programmable circuit, data related to the current frame to a processor communicatively coupled with the programmable circuit, wherein the processor is configured to execute a plurality of instructions for a machine-learning model stored on a memory; receiving, by the programmable circuit, overlay data generated by the machine-learning model based on a previous frame captured before the current frame; generating, by a mixer of the programmable circuit, a composite frame based on the current frame and the overlay data; and outputting, by the programmable circuit, the composite frame for display as a part of the video of the surgery.

Optionally, the programmable circuit comprises a field programmable gate array ("FPGA").

Optionally, the processor comprises a graphics processing unit ("GPU"), a central processing unit ("CPU"), an AI inferencing unit, or any combination thereof.

Optionally, the programmable circuit is associated with an operating room.

Optionally, wherein the surgical video data is captured by a camera in the operating room.

Optionally, wherein the camera in the operating room is an endoscopic camera, a PTZ camera, an exoscope camera, a boom light camera, a fluoroscope camera, or a microscope camera.

Optionally, the machine-learning model is configured to identify one or more objects of interest in an input frame and output one or more graphical overlays indicating the one or more objects of interest.

Optionally, the machine-learning model is configured to identify a measurement associated with two points of interest in an input frame and output a numeric overlay indicating the measurement.

Optionally, the machine-learning model is configured to identify a medical recommendation based on an input frame and output a textual overlay indicating the recommendation.

Optionally, the method further comprises: after receiving the current frame, generating, using a splitter of the programmable circuit, a copy of the current frame.

Optionally, the method further comprises: performing, by the programmable circuit, one or more preprocessing operations on the copy of the current frame to obtain the data provided to the processor.

Optionally, the one or more preprocessing operations comprise resizing the current frame.

Optionally, the one or more preprocessing operations comprise cropping the current frame.

Optionally, the one or more preprocessing operations comprise changing color of the current frame.

Optionally, changing the color of the current frame comprises converting the current frame to a different color space.

Optionally, the one or more preprocessing operations comprise generating an algebraic object based on the current frame.

Optionally, the algebraic object comprises a Tensor object.

Optionally, the one or more preprocessing operations comprise normalizing the current frame.

Optionally, the method further comprises: upon receiving the current frame, if no overlay data is available for the mixer to generate the composite frame, outputting, by the programmable circuit, the current frame for display.

Optionally, the overlay data is associated with a predefined display location, and the method further comprises: determining a new display location for the overlay data based on the surgical video data; and generating the composite frame by adding the overlay data to the current frame based on the new display location.

Optionally, the method further comprises: if a difference between the predefined display location and the new display location exceeds a threshold, foregoing, by the programmable circuit, generating the composite frame.

Optionally, the method further comprises: upon receiving the current frame, if no overlay data is available for the mixer to generate the composite frame: generating, by the programmable circuit, a projected overlay based on one or more previous overlays; and generating, by the mixer of the programmable circuit, the composite frame based on the current frame and the projected overlay.

Optionally, the method further comprises requesting, by a direct memory access ("DMA") controller, data from a memory associated with the processor.

Optionally, the method further comprises transferring, by the DMA controller, the requested data received from the memory associated with the processor to a video scan-out format.

Optionally, the video scan-out format comprises the High-Definition Multimedia Interface ("HDMI"), the DisplayPort interface, the serial digital interface ("SDI"), or any combination thereof.

Optionally, the method further comprises requesting, by the DMA controller, the data from the memory associated with the processor as needed without buffering more than ¼ of a full frame.

Optionally, the programmable circuit comprises a DMA controller configured to request the overlay data from a memory associated with the processor.

Optionally, the method further comprises transferring, by the DMA controller, the overlay data received from the memory associated with the processor to the mixer.

Optionally, the method further comprises receiving, by the mixer, the overlay data from the DMA controller and combining the received overlay data with the current frame to generate the composite frame.

Optionally, the method further comprises requesting, by the DMA controller, the overlay data from the memory associated with the processor as needed without buffering more than ¼ of a full frame.

Optionally, the method further comprises requesting, by the mixer, a pixel of the overlay data from the DMA controller before receiving a corresponding pixel in the current frame.

Optionally, the method further comprises: providing, by the processor, an input frame to the machine-learning model to obtain an output overlay; and providing, by the processor, the output overlay to the programmable circuit.

Optionally, the method further comprises: receiving a first request associated with a first application to execute the machine-learning model to process an input frame; executing, by the processor, the machine-learning model to obtain an output based on the input frame; receiving a second request associated with a second application to execute the machine-learning model to process the input frame; and, upon determining that the first request and the second request are directed to the same machine-learning model, foregoing re-executing the machine-learning model by the processor based on the second request.

Optionally, the machine-learning model is associated with a unique identifier.

According to an aspect, an exemplary non-transitory computer-readable storage medium stores one or more programs. The one or more programs comprise instructions, which when executed by one or more processors of a system, cause the system to perform any of the methods described herein.

According to an aspect, an exemplary computer program product comprises instructions which, when the program is executed by any of the systems described herein, cause the system to carry out any of the methods described herein.

According to an aspect, an exemplary device for processing surgical video data associated with a surgery, comprises: a housing; a programmable circuit enclosed in the housing configured to receive the surgical video data from a camera control unit; a processor enclosed in the housing communicatively coupled with the programmable circuit and configured to execute a plurality of instructions for processing the video data stored on a memory; and a plurality of Universal Serial Bus (USB) connectors exposed on the housing configured to connect to a plurality of peripheral devices. The plurality of USB connectors comprises: at least one non-galvanically-isolated USB connector; and at least one galvanically-isolated USB connector configured to be connected to a surgical device for contact with a patient during the surgery.

Optionally, the surgical device comprises: a pointer device, a measurement device, an ultrasound detector, an imager, or any combination thereof.

Optionally, the at least one galvanically-isolated USB connector comprises a USB 2.0 connector or a USB 3.0 connector.

Optionally, the at least one galvanically-isolated USB connector comprises a USB digital isolator, an isolated DC-to-DC converter, or a combination thereof.

Optionally, the at least one galvanically-isolated USB connector is configured to provide a power line, a ground line, and one or more signal transmission lines with the surgical device.

Optionally, the at least one non-galvanically-isolated USB connector comprises a USB 3.x Type C connector or a USB 3.x Type A connector.

Optionally, the at least one non-galvanically-isolated USB connector is configured to connect to a storage device, a printer, an input device, an output device, a camera, or any combination thereof.

Optionally, the processor comprises a graphics processing unit ("GPU"), a central processing unit ("CPU"), an AI inferencing unit, or any combination thereof.

According to an aspect, an exemplary computer program product comprises instructions which, when the program is executed by any of the systems described herein, cause the system to carry out any of the methods described herein.

DETAILED DESCRIPTION

Figure 1:
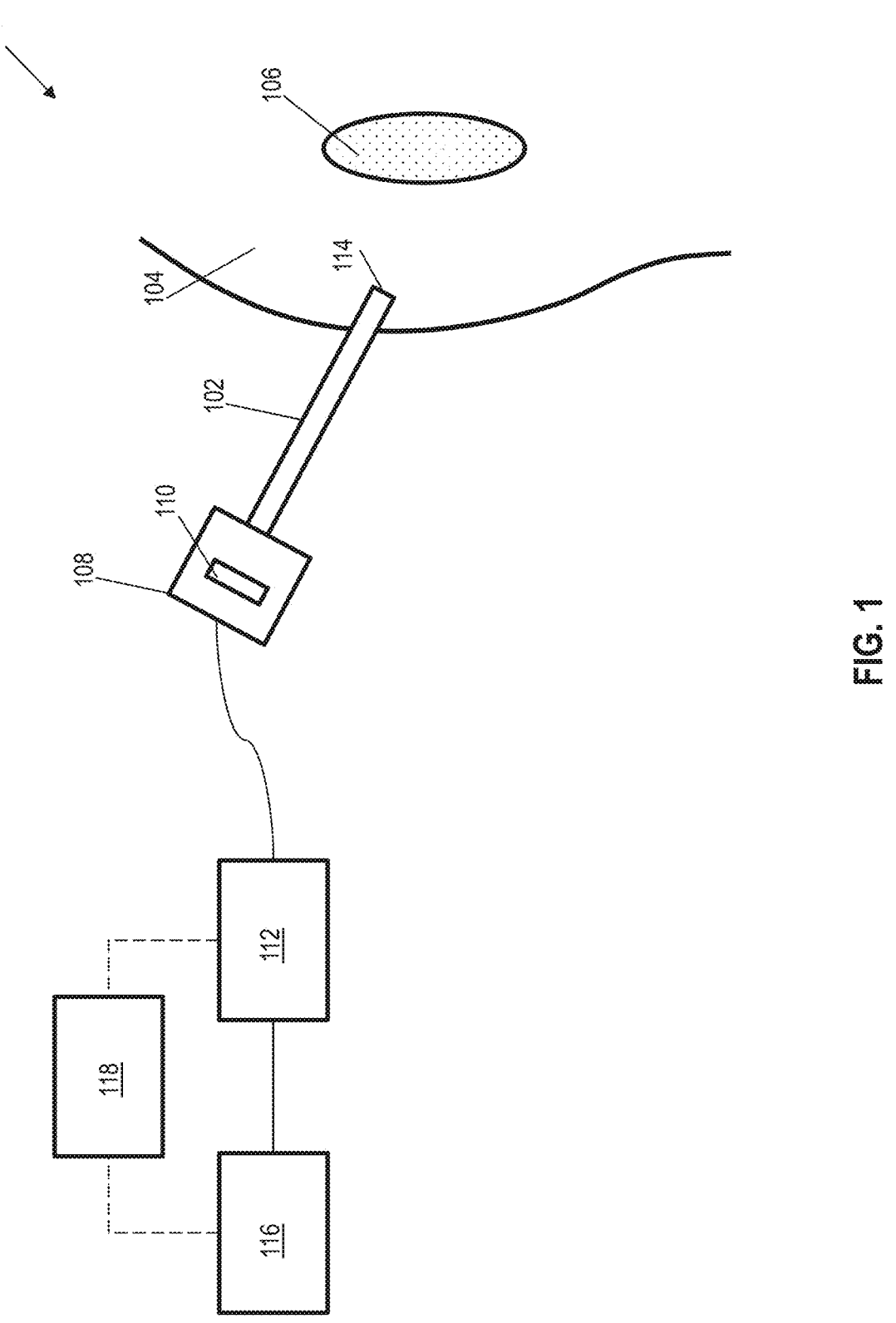
FIG. 1 illustrates an exemplary endoscopy system according to examples of the disclosure.

The following description is presented to enable a person of ordinary skill in the art to make and use the various examples. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various examples. Thus, the various examples are not intended to be limited to the examples described herein and shown, but are to be accorded the scope consistent with the claims.

Disclosed herein are exemplary devices, apparatuses, systems, methods, and non-transitory storage media for processing and displaying medical imaging data. Examples of the present disclosure include computing and processing system architectures for real-time processing and displaying of medical imaging data (e.g., endoscopy and/or fluorescence imaging) that provide robust processing capabilities while also minimizing system latency to ensure that any processing does not lead to significant time lag between the collection of the imaging data and the display of the data. An exemplary system for generating a video of a surgery can comprise: a processor configured to execute a plurality of instructions for a machine-learning model stored on a memory and a programmable circuit communicatively coupled with the processor. The programmable circuit is programmed to: receive surgical video data comprising a current frame; provide data related to the current frame to the processor; receive overlay data generated by the machine-learning model based on a previous frame captured before the current frame; generate, by a mixer of the programmable circuit, a composite frame based on the current frame and the overlay data; and output the composite frame for display as a part of the video of the surgery.

Examples of the present disclosure may introduce no or minimal latency between receiving an input image frame and outputting the machine-learning-based enhanced image frame for display. For a given image frame, the programmable circuit can mix the given image frame with overlay data with no or minimal latency because the overlay data (albeit generated based on a previous image frame) with the given image frame is already available for mixing with the given image frame as soon as the given image frame arrives at the mixer. Thus, the execution of the machine-learning models to process the given image frame, or any image frame or that matter, is no longer in the critical path between the collection of the given image frame and the AI enhancement of the given image frame. In some examples, the latency between receiving an input image frame and outputting a composite image of the input frame and overlay data is less than a full image frame. In some examples, the latency between receiving an input image frame and outputting the composite image of the input frame and overlay data is less than half a full image frame. The latency may be due to the management and adaption of different clocks at the various components of the system, but not due to the execution of machine-learning models. Accordingly, examples of the present disclosure can provide a significant improvement over current medical imaging processing systems by increasing the real-time processing capabilities of medical imaging data (e.g., by adding advanced AI processing power to the surgical video workflow) while minimizing latency.

While some examples of the present disclosure involve execution of machine-learning models, it should be appreciated the techniques described herein can allow processing of imaging data by any type of imaging processing algorithms without introducing significant latency between the collection of the imaging data and the display of such data.

In the following description of the various examples, it is to be understood that the singular forms "a," "an," and "the"

used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some examples also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

FIG. 1 illustrates an exemplary endoscopy system, in accordance with some examples. System 100 includes an endoscope 102 for insertion into a surgical cavity 104 for imaging tissue 106 within the surgical cavity 104 during a medical procedure. The endoscope 102 may extend from an endoscopic camera head 108 that includes one or more imaging sensors 110. Light reflected and/or emitted (such as fluorescence light emitted by fluorescing targets that are excited by fluorescence excitation illumination light) from the tissue 106 is received by the distal end 114 of the endoscope 102. The light can be propagated by the endoscope 102, such as via one or more optical components (for example, one or more lenses, prisms, light pipes, or other optical components), to the camera head 108, where it is directed onto the one or more imaging sensors 110. In one or more examples, one or more filters (not shown) may be included in the endoscope 102 and/or camera head 108 for filtering a portion of the light received from the tissue 106 (such as fluorescence excitation light).

The one or more imaging sensors 110 generate pixel data that can be transmitted to a camera control unit 112 that can be communicatively connected to the camera head 108. The camera control unit 112 generates a video feed from the pixel data that shows the tissue being viewed by the camera at any given moment in time. In one or more examples, the video feed can be transmitted to an image processing unit 116 for further image processing, storage, display, and/or routing to an external device (not shown). The images can be transmitted to one or more displays 118, from the camera control unit 112 and/or the image processing unit 116, for visualization by medical personnel, such as by a surgeon for visualizing the surgical field 104 during a surgical procedure on a patient. In some examples, the camera control unit 112 and the image processing unit 116 may be combined in a single housing or enclosure.

In one or more examples, imaging processing unit 116 can apply one or more image processing algorithms to any data received from the camera control unit in order to improve the image quality of the data before it its transmitted to the one or more displays 118. In one or more examples of the disclosure, the image processing unit 116 can comprise a combination of ASICS, FPGAs, digital signal processors (DSP), GPUs, and generalized CPUs that can be collectively coupled to one another so as to carry out any image processing tasks on the image data received from camera control unit 112. However, traditional configuration of these processing units, while capable of performing a myriad of imaging processing tasks, may not be able to perform more complex image processing tasks because these systems may not be able to perform more complex image processing tasks without introducing unacceptable latency between the moment when an image is captured by the camera and the moment that that image is displayed. For example, current system architectures may rely on the same processing system to process each image frame using one or more machine-learning models to obtain overlay data (e.g., on a processing device such as a GPU), mix the image frame and the overlay data, and output the mixed data. Execution of the machine-learning models, which is in the critical path between receiving an image frame and displaying the enhanced image frame, can add significant latency (e.g., over 4 frames of latency, more than 150 ms, etc.). Such latency is not acceptable for medical imaging applications, which typically require the latency of the total system to be less than 100-150 ms, especially those used in the surgical context.

Figure 2:
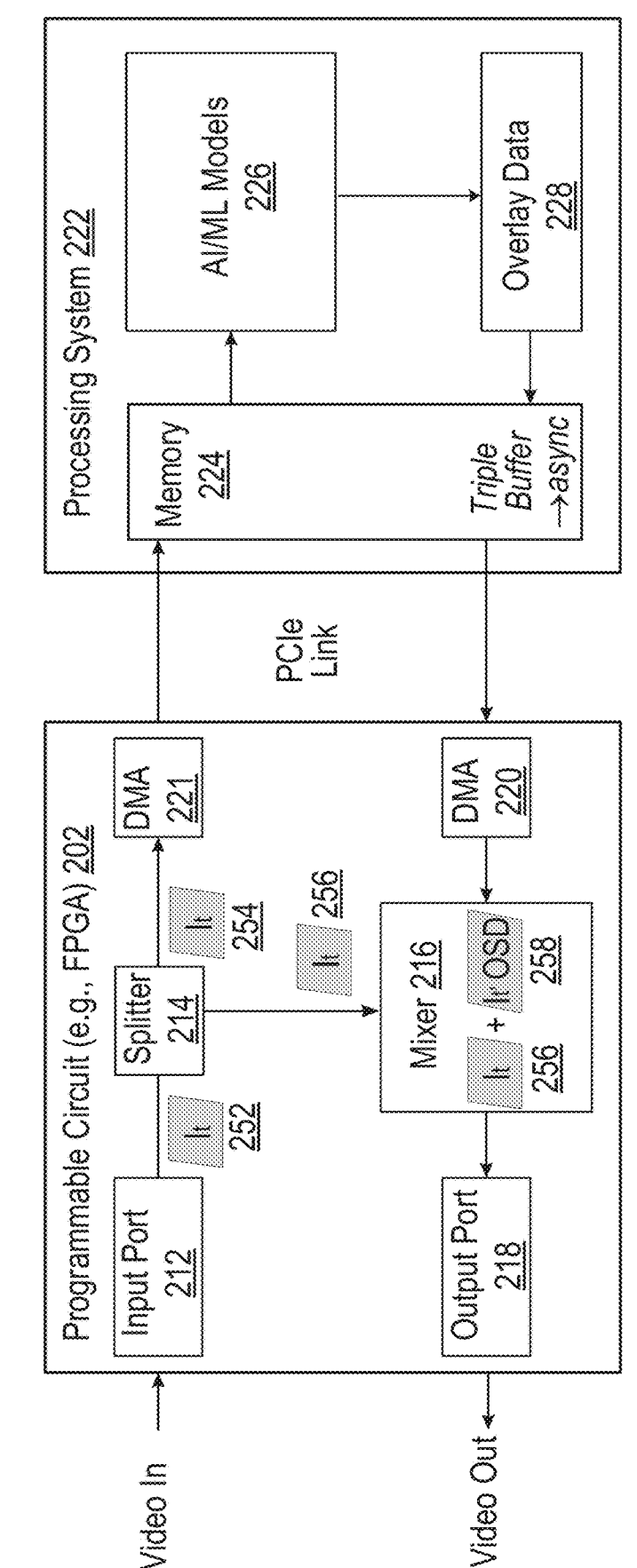
FIG. 2 illustrates an exemplary processing architecture according to examples of the disclosure.

FIG. 2 illustrates an exemplary system 200 for processing a video of a surgery, in accordance with some examples. The system 200 may receive imaging data from a medical imaging device (e.g., endoscopic camera head 108 in FIG. 1, or the camera control unit 112 in FIG. 1), process the received imaging data, and output the processed imaging data for display on a display (e.g., display 118 in FIG. 1). System 200 is not limited to receiving and processing imaging data generating by an endoscopic imaging system. Rather, system 200 can receive and process imaging data from any type of imaging system, including, for example, from a fluoroscope, a surgical microscope and other exoscope, a PTZ room camera, and/or a boom light camera. In some examples, the system 200 may be associated with a single medical imaging device and be configured to process the imaging data (e.g., one or more medical images) captured by the single medical imaging device. In other examples, the system 200 may be associated with multiple medical imaging devices and configured to process imaging data captured by the multiple imaging devices (e.g., a frame with color information and a frame with fluorescence information). Components of the system 200 can be enclosed in a single housing or distributed among multiple housings. The one or more housings may be placed in a single room (e.g., a single operating room, a single control room) or distributed across multiple rooms.

With reference to FIG. 2, the system 200 can comprise a programmable circuit 202 and a processing system 222. As discussed above, in some examples, the two components may be enclosed in a single housing as an external AI processing device. The device may be placed in an operating room for processing imaging data such as live surgical video data from surgeries conducted in the operating room. In some examples, the two components may be distributed among separate housings, which may be placed in one or more rooms for processing imaging data such as live surgical video data.

The processing system 222 can comprise one or more memories (e.g., memory 224), one or more processors (e.g., a GPU, a central processing unit or CPU, an AI inference unit or processor such as a tensor processing unit (TPU)), or any combination thereof. The one or more processors can execute one or more programs comprising instructions for one or more trained AI or machine-learning models 226 stored on the memory of the processing system 222. In some examples, the processing system 222 can receive an input image frame, which may be provided by the programmable circuit 202 communicatively coupled to the processing system. In the depicted example in FIG. 2, the input frame can be received at the memory 224 of the processing system 222 via direct memory access 221. The processor(s) on the processing system 222 can then execute the one or more trained machine-learning models 226 to generate output data such as overlay data or on-screen overlay display (OSD) data 228. In some examples, the overlay data 228 can be placed in one or more buffers so that the programmable circuit 202 can request and/or access it. In some examples, the processing system 222 can comprise a plurality of buffers such as one buffer for writing, one buffer for reading, one buffer for processing data. In some examples, the DMA engines can be part of the processing system instead of the programmable circuit.

The one or more machine-learning models 226 can generate various types of output data that may enhance the live surgical video data. In some examples, the one or more machine-learning models 226 can be configured to identify one or more objects of interest in an input frame and output one or more graphical overlays indicating the one or more objects of interest. For example, the machine-learning models may identify anatomical features of interest (e.g., a polyp or cyst) in an input frame and output graphical overlays (e.g., a bounding box) indicating the detected anatomical features. As another example, the machine-learning models may identify people not wearing surgical masks or not following surgical protocols in an input frame and output graphical overlays indicating the detected violations.

In some examples, the machine-learning models 226 can be configured to identify a measurement associated with two points of interest in one or more input frames and output a numeric overlay indicating the measurement. For example, the machine-learning models 226 may process one or more input frames depicting two pointers placed into the patient, calculate the physical distance between the two pointers, and output the calculated physical distance for display.

In some examples, the machine-learning models 226 can be configured to identify a medical recommendation based on an input frame and output a textual overlay indicating the recommendation. For example, the machine-learning models 226 may process an input frame or a series of frames to determine that the visibility at a surgical site is low (e.g., due to blood, debris, bubbles) and that a pump needs to be activated to provide a flow of saline, and output a textual overlay indicating the determination. In some examples, the pump may be automatically activated and the output can comprise a status indicator of the pump. As another example, the machine-learning models may process an input frame to determine whether/where to make a dissection and output a graphical overlay and/or a textual overlay indicating the recommendation. In some examples, the machine-learning models 226 can be configured to detect a surgical phase or milestone. For example, the machine-learning models 226 may process an input frame or a series of frames to determine a current surgical phase or milestone in an operating room.

In some examples, the machine-learning models 226 can be executed asynchronously. In other words, the machine-learning models 226 can be invoked and executed whenever an input frame is provided to the machine-learning models. Further, the output data (e.g., overlay data 228) can be transmitted to, or made available to, the programmable circuit 202 the moment it is ready. The execution of the machine-learning models 226 may be computationally intensive. For example, large machine-learning models or slow CPU/GPU may contribute latency to the overlay. Nevertheless, the configuration of the system 200 allows the overlay data to be generated and incorporated into the surgical video data without introducing significant latency, as described below.

The programmable circuit 202 can receive imaging data from a medical imaging device (e.g., endoscopic camera head 108 in FIG. 1, the camera control unit 112 in FIG. 1), process the received imaging data with the help of the processing system 222, and output the processed imaging data for display on a display (e.g., display 118 in FIG. 1). In the depicted example, the programmable circuit 202 comprises a field programmable gate array ("FPGA"). However, it should be appreciated that other types of programmable devices can be used as the programmable circuit 202 in the system 200, such as an application-specific integrated circuit (ASIC), an image signal processor (ISP), etc.

With reference to FIG. 2, the programmable circuit 202 can receive input imaging data (e.g., surgical video data) via an input port 212. The input imaging data can comprise a series of image frames. In the depicted example, the programmable circuit 202 receives a current image frame $I_t$ 252 captured at time t via the input port 212. The programmable circuit 202 can generate two identical instances of the current image frame $I_t$ 252. In the depicted example, the programmable circuit 202 can comprise a splitter 214. The splitter can be configured to generate two identical instances or copies of the current image frame $I_t$ 252: a first instance of the current image frame 254 and a second instance of the current image frame 256.

The first instance of the current image frame 254 can be provided by the programmable circuit 202 to the processing system 222. In the depicted example, the first instance of the current image frame 254 is provided by the programmable circuit 202 to the processing system 222 via DMA 221. As described above, the processing system 222 can then execute the one or more trained machine-learning models 226 using its one or more processors to generate output data such as overlay data 228. In some examples, the overlay data 228 can be placed in one or more buffers so that the programmable circuit 202 can request and/or access it.

The second instance of the current image frame 256 can be combined with overlay data by the programmable circuit 202 to generate a composite frame. In some examples, the programmable circuit 202 can comprise a mixer 216. As depicted in FIG. 2, after the splitter 214 splits the current image frame 252 into two instances 254 and 256, the mixer 216 receives the second instance of the current image frame 256. Further, the programmable circuit 202 can receive overlay data via DMA 220 from the processing system 222 and provide the overlay data (in the form of OSD data 258) to the mixer 216. In some examples, the DMA controller 220 is configured to request the overlay data from the processing system 222 as needed without buffering more than a few lines (e.g., ¼ of a full frame). The buffer may be only to manage any potential back pressure of the PCI Express.

At the mixer 216, the second instance of the current image frame and the overlay data 258 are combined to generate a composite image frame. Due to the above-described latency introduced by the machine-learning models 226, the overlay data 258 available to be combined with the current image frame $I_t$ at the mixer 216 may not be generated based on the current image frame $I_t$, but rather may be generated based on a previous image frame $I_{t'}$ captured at t' before t. At an earlier time (not depicted in FIG. 2), the programmable circuit 202 received a previous image frame $I_{t'}$ captured at t' before t. The programmable circuit 202 generated two identical instances of the previous image frame $I_{t'}$ via the splitter 214. One instance of the previous image frame $I_{t'}$ was then provided to the processing system 222 for processing by the one or more machine-learning models 226 to generate overlay data 258. The resulting overlay data generated based on $I_{t'}$ was then provided to the programmable circuit 202 via DMA 220.

When the mixer 216 receives the first instance of the current image frame 256 for mixing, the available overlay data to be mixed at the mixer 216 may be overlay data 258 generated based on the previous image frame $I_{t'}$ because the overlay data associated with $I_t$ has not been generated and/or made available to the mixer. This is because it can take less time for the current image frame $I_t$ to arrive at the mixer 216 than for the current image frame $I_t$ to be processed by the machine-learning models 226 and the resulting overlay data based on $I_t$ to be provided to the mixer 216. After the mixer 216 generates the composite image frame, the programmable circuit 202 can output the composite frame for display via output port 218 as a part of the video of the surgery.

The system 200 introduces no or minimal latency between receiving an input image frame at the video input port 212 and outputting the composite image of the input frame and overlay data at the video output port 218. For a given image frame, the programmable circuit can mix the given image frame with overlay data with no or minimal latency because the overlay data (albeit generated based on a previous image frame) is already available for mixing with the given image frame as soon as the given image frame arrives at the mixer 216. Thus, the execution of the machine-learning models 226 to process the given image frame, or any image frame or that matter, is no longer in the critical path between the collection of the given image frame and the AI enhancement of the given image frame. In some examples, the latency between receiving an input image frame at the video input port 212 and outputting the composite image of the input frame and overlay data at the video output port 218 is less than a full image frame. In some examples, the latency between receiving an input image frame at the video input port 212 and outputting the composite image of the input frame and overlay data at the video output port 218 is less than half a full image frame. The latency may be due to the management and adaption of different clocks at the various components of the system 200.

While the processing system 222 depicted in FIG. 2 stores machine-learning models, it should be appreciated that the processing system 222 may store image processing algorithms that are not machine-learning-based or AI-based. Indeed, the techniques described herein can allow processing of any type of imaging data (e.g., obtained by any type of imaging systems) by any type of imaging processing algorithms without introducing significant latency between the collection of the imaging data and the display of such data. In some examples, the processing system may use multiple frames (e.g., $I_t$ and $I_{t'}$) to generate the output.

Asynchronous Overlay/Skipping Overlay

To compensate for the lag between the base image frame (e.g., $I_t$ 256 in FIG. 2) and the overlay data (e.g., overlay data 258 which is generated based on $I_{t'}$) in a composite image, the system 200 may track the movement of objects in the video data and adjust the location of the overlay in the composite image accordingly. For example, if the machine-learning models 226 include a segmentation model configured to identify an object of interest and provide overlay data indicating the location of the object of interest, the system may track the movement of the object of interest across multiple frames in the video data. When the overlay data is generated based on a given frame to indicate the location of the object of interest, the system can adjust the location of the overlay because the overlay data is to be mixed with a frame that is captured later than the given frame. The system can do so by projecting where it expects the object to be in the later frame and shift the location of the overlay in the composite image accordingly. In other words, the machine-learning models may output overlay data and an associated display location for the overlay data, but the system (e.g., either the programmable circuit or the processing system) can determine a new display location for the overlay data based on the surgical video data and generate the composite frame by adding the overlay data to the current frame based on the new display location. In some examples, tracking of an object in video data can be performed using optical flow techniques. In some examples, the motion tracking can be done based on yet another frame that is not $I_t$ or $I_{t'}$ (e.g., a frame captured between these two frames). In some examples, if the system is configured to track a bounding box around an object of interest, tracking of the object in video data can be performed by determining the velocity and acceleration of each corner of the box based on the previous one or more frames, and projecting the location of the bounding box (e.g., using polynomial interpolation).

In some examples, the system 200 may skip mixing overlay data with an image frame if it has low confidence in the accuracy of the overlay data. In some examples, if the difference between the original display location and the projected new display location exceeds a predefined threshold, the system may forego generating the composite frame and, in some examples, directly output the input image instead. A large difference between the original display location and the projected new display location may indicate abrupt changes by the camera (e.g., the endoscope is inserted into the cavity). Accordingly, the system may forgo mixing the overlay data and/or perform a new calculation.

Pre-Processing at the Programmable Circuit

To reduce computational burden on the processing system 222, some operations that are typically done by the processor(s) of the processing system 222 may be offloaded to the programmable circuit 202. For example, one or more of the machine-learning models 226 may require a specific format of input. For example, they may require that the input image data be an algebraic or mathematical object such as a Tensor object, that the input image data be reformatted from the raw resolution and color depth, etc. For example, a raw image frame may be a 4k 10-bit color image at a 16:9 aspect ratio, but to prepare the Tensor object, the system 200 may need to resize the image to a 512×512 image and change the color depth to 8-bit. In some examples, the programmable circuit 202 can be configured to perform one or more preprocessing operations on the current frame (e.g., the first instance of the current frame 254 in FIG. 2) before providing it to the processor(s) of the processing system 222. The one or more preprocessing operations can comprise resizing the current frame, cropping the current frame, changing color of the current frame (e.g., converting the current frame to a different color space), generating an algebraic object (e.g., Tensor object) based on the current frame, normalizing the current frame, or any combination thereof. In some examples, some preprocessing may still be done by the processing system 222.

Performing at least some of the preprocessing operations on the programmable circuit 202 and using DMA 221 to move the result (e.g., the Tensor object) to the processing system 222 may be faster than performing all of the preprocessing on the processing system 222 and result in lower latency. For example, the FPGA can perform down-sampling or downscaling of the imaging data and Tensor preparation more efficiently. Further, it can reduce the processing load of the processing system 222 and avoid slower processing to perform downsampling/cropping of raw video frame to Tensor dimensions, thus allowing the processing system 222 to have more bandwidth to execute the machine-learning models 226. Such offloading can also reduce the traffic on the PCIe link, thus reducing the time to move the frame data to the CPU or GPU.

Mixer Pass-Through

To ensure that the surgical video data is continuously provided to the surgeon in a real-time manner, the mixer 216 at the programmable circuit 202 may be configured to operate with minimal latency even when no overlay data is available for mixing. Further, if the processing system crashes but the mixer still has power, the system can continue to show the underlying video, which enhances the safety of the system by allowing the surgeon to continue operation while the processing system reboots. For example, upon receiving a frame (e.g., $I_f$ 256 in FIG. 2), if no overlay data is available for the mixer 216 to generate the composite frame, the mixer 216 can directly output the current frame via the output port 218 for display rather than waiting for overlay data to arrive. In other words, the current frame $I_f$ can pass through the mixer 216 without being mixed with any overlay data if no overlay data is available. Accordingly, even if the processing system 222 does not provide overlay data on time due to an error (e.g., the processors crashing, the machine-learning models 226 taking longer to generate overlay data), the surgeon can still receive real-time video feed as long as the programmable circuit 202 is powered on and operating, thus ensuring surgical safety.

Overlay Re-Projection

The machine-learning models 226 may be generate overlay data at a different rate as the rate at which the programmable circuit receives input image frames. For example, the programmable circuit 202 may be configured to operate at 60 frames per second (fps) while the machine-learning models 226 may run at a rate lower than 60 fps. Thus, not all input frames at the programmable circuit 202 can be combined with different overlays.

In some examples, if the mixer 216 receives an input frame but no new overlay data is available for the mixer 216 to generate the composite image frame, the system 200 may use a previously used overlay to mix with the input frame and generate the composite image frame. In some examples, the system can apply the same overlay at the same location across multiple frames until a new overlay is provided. In some other examples, upon receiving a current frame, if no new overlay data is available for the mixer to generate the composite frame, the programmable circuit may be configured to generate a new projected overlay based on one or more previously used overlays. For example, the system may generate a new projected overlay based on three previously used overlays. The new overlay may be at a different location based on the projection. The system can then generate the composite frame based on the current frame and the projected overlay.

Processing System Directly Outputting Video Data

In the depicted example in FIG. 2, mixing of the base imaging data and the overlay data can occur at the mixer 216 on the programmable circuit 202. In other examples, the mixing operation may be performed by the processor(s) of the processing system 222, for example, on a thread from the thread executing the machine-learning models 226. For example, the processing system 222 may comprise a DMA controller configured to request data from a memory of the processing system (e.g., a memory associated with the processors of the processing system). The DMA controller can be configured to transfer the requested data received from the memory of the processing system directly to a video scan-out format, rather than transmitting the data to the programmable circuit 202 or a frame buffer. The video scan-out format can comprise the High-Definition Multimedia Interface ("HDMI"), the DisplayPort interface, the serial digital interface ("SDI"), or any other video transport format (e.g., raw sensor data, MIPI, video over IP).

Accordingly, the system 200 can avoid frame-buffer latency with a read DMA that requests pixels on demand from system memory of the processing system and transfers direct a video scan-out format. In some examples, the DMA controller can be configured to request the data from the memory of the processing system 222 in real time as needed and transfer the data via a video-out format. The DMA may comprise a look-ahead mechanism and request the next few lines to buffer a few lines (e.g., 1-2 lines, no more than ¼ of a full frame) but not the full image. This way, the DMA would not introduce another frame of latency because the frame would not have to be buffered on the programmable circuit and introduce a frame of latency.

Look-Ahead Mechanism at the Mixer

The mixer 216 may have a look-ahead mechanism to request and/or read overlay pixels from the PCIe link and the read DMA 220 in advance so that the overlay pixels from the overlay data are always ready for mixing. In some examples, the mixer can start requesting overlay pixels the moment it determines that the overlay pixels will be needed. For example, the mixer 216 can be configured to request, from the DMA controller 220 of the programmable circuit 202, a pixel of the overlay data before receiving a corresponding pixel in the current frame. As another example, the mixer 216 can be configured to request the overlay pixels for the next frame because the mixing of the current frame is complete. Accordingly, the system 200 can receive the video input and produces a video output with zero or only a few lines of latency.

De-Duplicating Usage Across Multiple AI Applications

The system 200 may be configured to de-duplicate usage of machine-learning models 226 when multiple software applications request to execute the same machine-learning model(s) to process the same input. For example, at a first time, the system may first receive a first request associated with a first application to execute one or more of the machine-learning models 226 to process an input frame and proceed to execute, by the processing system 222, the machine-learning model(s) to obtain an output based on the input frame. At a second time later than the first time, the system may receive a second request associated with a second application to execute the same machine-learning model(s) to process the same input frame. Upon determining that the first request and the second request are directed to the same machine-learning model(s), the system may forego re-executing the machine-learning model(s) by the processor based on the second request and simply provide the previously obtained output from the first request.

In some examples, each software application that may request execution of the machine-learning models 226 can be configured as a plug-in to the software of the system 200. Each application can be in the form of a plug-in package including one or more files specifying the application code and specifying the machine-learning model(s) it may call. A machine-learning model may be associated with a unique identifier that can be recognized by the system 200. For example, multiple applications may specify that it may call a machine-learning model (identified by the same ID) to determine if an endoscope is within a patient's body. This way, when the system 200 receives a request from an application to execute the model, the system may determine that it has previously executed the model to process the same input and provide the previously obtained output to the application rather than re-executing the model.

Side-Running Frame Buffer

Depending on the load, various components of the system 200, such as the processing system 222 and the PCIe link, can have indeterministic backpressure, which can cause delay to response. While this can be mitigated with a larger FIFO buffer, the buffer may add latency. In some examples, the system can comprise a side-running buffer which has the pixels ready from the last frame (or the last line) for each coordinate, which can be used as stand-in for overly delayed PCIe data. By default, the pixels in the side-running buffer are not used. But, in case the data from PCIe does not arrive in time, the data in the side-running buffer can be used as replacement. In some examples, the system can detect this state of delay, drop the late arriving pixels from the incoming queue, and obtain data from the side-running buffer.

Accordingly, the system can sidestep variable PCIe responsiveness with use of the side-running buffer.

Figure 3:
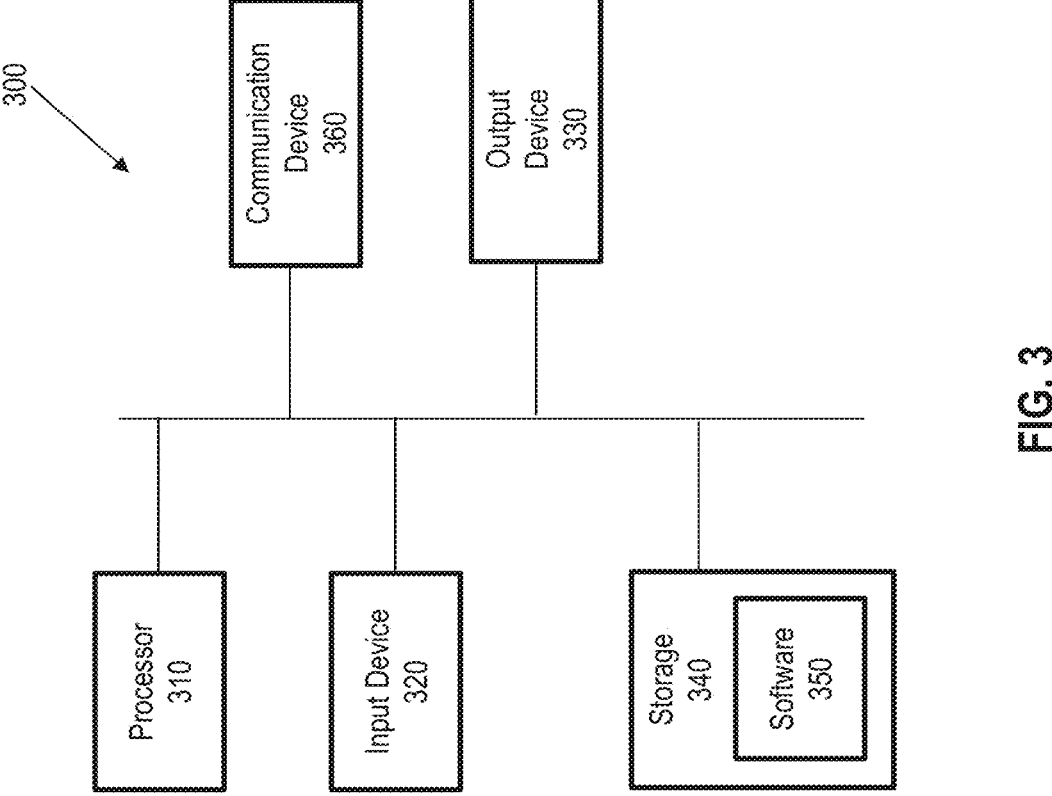
FIG. 3 illustrates an exemplary computing system, according to examples of the disclosure.

The operations described herein are optionally implemented by components depicted in FIG. 3. FIG. 3 illustrates an example of a computing device in accordance with one example. Device 300 can be a host computer connected to a network. Device 300 can be a client computer or a server. As shown in FIG. 3, device 300 can be any suitable type of microprocessor-based device, such as a personal computer, workstation, server or handheld computing device (portable electronic device) such as a phone or tablet. The device can include, for example, one or more of processor 310, input device 320, output device 330, storage 340, and communication device 360. Input device 320 and output device 330 can generally correspond to those described above, and can either be connectable or integrated with the computer.

Input device 320 can be any suitable device that provides input, such as a touch screen, keyboard or keypad, mouse, or voice-recognition device. Output device 330 can be any suitable device that provides output, such as a touch screen, haptics device, or speaker.

Storage 340 can be any suitable device that provides storage, such as an electrical, magnetic or optical memory including a RAM, cache, hard drive, or removable storage disk. Communication device 360 can include any suitable device capable of transmitting and receiving signals over a network, such as a network interface chip or device. The components of the computer can be connected in any suitable manner, such as via a physical bus or wirelessly.

The examples described herein may be implemented as a computer program product, such as software 350. Software 350, which can be stored in storage 340 and executed by processor 310, can include, for example, the programming that embodies the functionality of the present disclosure (e.g., as embodied in the devices as described above). Software 350 is an example of a computer implemented method for generating a video of a surgery, using any of the exemplary systems described above.

Software 350 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 340, that can contain or store programming for use by or in connection with an instruction execution system, apparatus, or device.

Software 350 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, fiber optic, DSL, or telephone lines.

Device 300 can implement any operating system suitable for operating on the network. Software 350 can be written in any suitable programming language, such as C, C++, Java or Python. In various examples, application software embodying the functionality of the present disclosure can be deployed in different configurations, such as in a client/server arrangement or through a Web browser as a Web-based application or Web service, for example.

Figure 4:
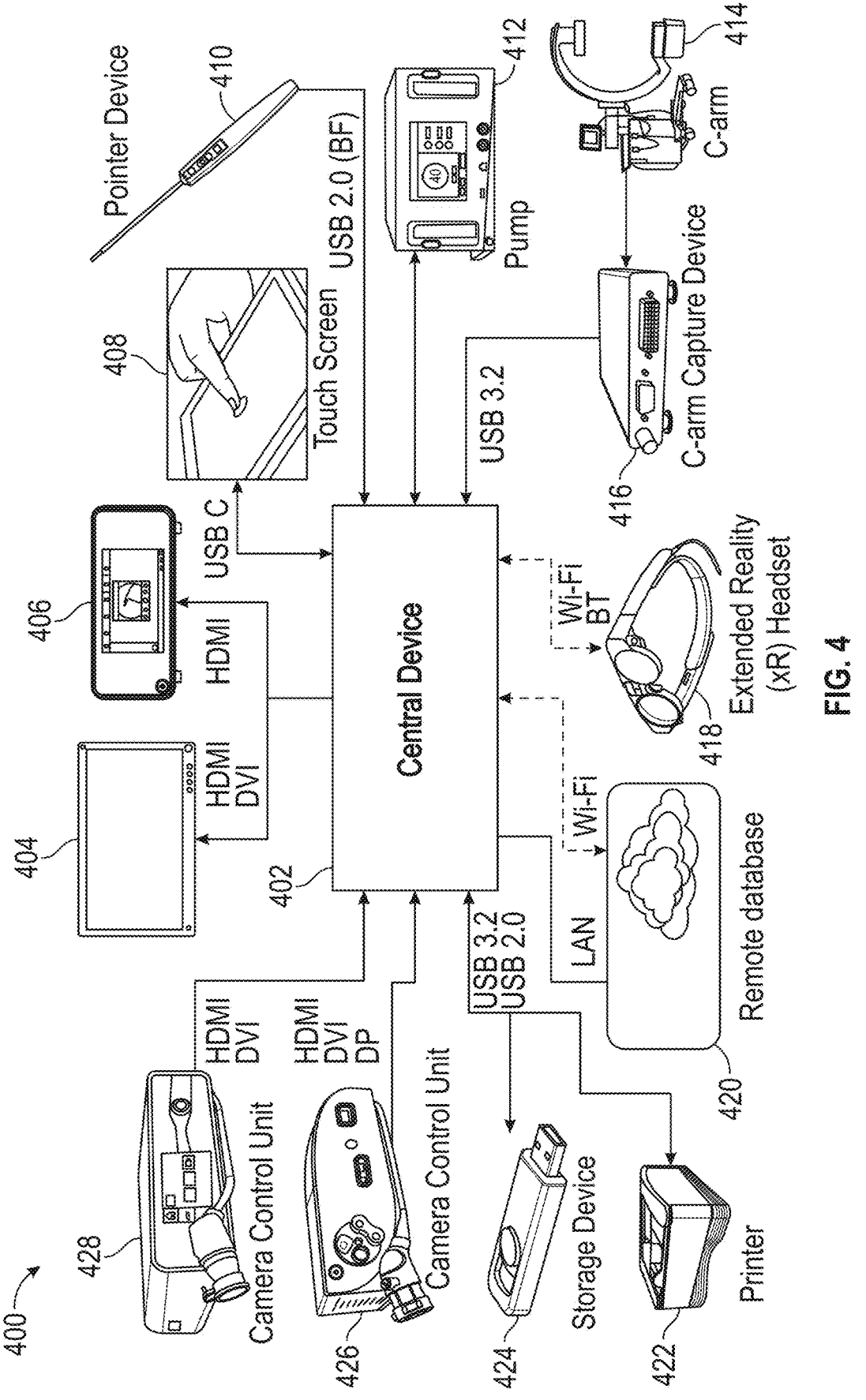
FIG. 4 illustrates an exemplary system for managing various devices in a surgical environment, according to examples of the disclosure.

FIG. 4 illustrates an exemplary system 400 for managing various devices in a surgical environment. With reference to FIG. 4, the system 400 includes a central device 402 for processing surgical video data. In some examples, the central device 402 includes one or more components described herein for processing surgical video data, such as programmable circuit 202 of FIG. 2 or its subparts, processing system 222 of FIG. 2 or its subparts, or any combination thereof.

With reference to FIG. 4, the central device 402 can be connected with a plurality of devices associated with a surgical environment (e.g., an operating room). The central device 402 can be connected to one or more display devices for displaying surgical video data, such as a first display device 404 and a second display device 406, via a High-Definition Multimedia Interface (HDMI) or Digital Visual Interface (DVI) connection. The central device 402 can be connected to one or more touch screens, such as touch screen 408, via a Universal Serial Bus Type-C (USB-C) connector. The central device 402 can be connected to one or more surgical pumps, such as arthroscopy pump 412, such as via a Stryker Firewire Bus (SFB), Stryker Realtime Bus (SRB), generic FireWire, Ethernet, USB, or any other suitable connection. The central device 402 can be connected to a C-arm capture device, such as C-arm capture device 416, via a USB 3.2 connection. The C-arm capture device 416 can be in turn connected to one or more C-arm imaging devices, such as C-arm imaging device 414. The central device 402 can be connected to one or more extended or augmented reality devices, such as extended reality headset 418, via a Wi-Fi or Bluetooth connection. The central device 402 can be connected to one or more remote devices, such as databases 420 for storing health-related software tools and patient records, via a Wi-Fi or Local Area Network (LAN) connection. The central device 402 can be connected to one or more printers, such as printer 422, via a USB 3.2 or USB 2.0 connection. The central device 402 can be connected to one or more storage devices, such as USB storage device 424 for storing files (e.g., software programs, logs), via a USB 3.2 or USB 2.0 connection. The central device 402 can be connected to one or more Camera Control Units (CCUs), such as CCU 426 and CCU 428, via an HDMI, DVI, or Display Port (DP) connection. To facilitate these connections, the central device 402 may comprise a plurality of connectors as described herein. It should be appreciated by one of ordinary skill in the art that the central device 402 is not limited to connecting with the devices illustrated in FIG. 4, but rather can be connected to any systems, devices, and apparatuses associated with a surgical environment.

With reference to FIG. 4, the central device 402 can be connected to one or more surgical devices to, for example, obtain video data from the surgical devices, monitor the surgical devices, and/or control the surgical devices. The surgical devices may be configured to contact with a patient during surgery internally (e.g., into a surgical site) or externally (e.g., touching the patient's skin). Exemplary surgical devices can include: a pointer device for taking internal measurements, a device for measuring pressure, a device for measuring temperature, an ultrasound detector, an imager, or any combination thereof. In the depicted example, the central device 402 is connected to a pointer device 410. As described herein, the central device 402 can provide at least one galvanically-isolated USB connector configured to be connected to surgical devices to prevent electrical shock to the patient.

Figure 5:
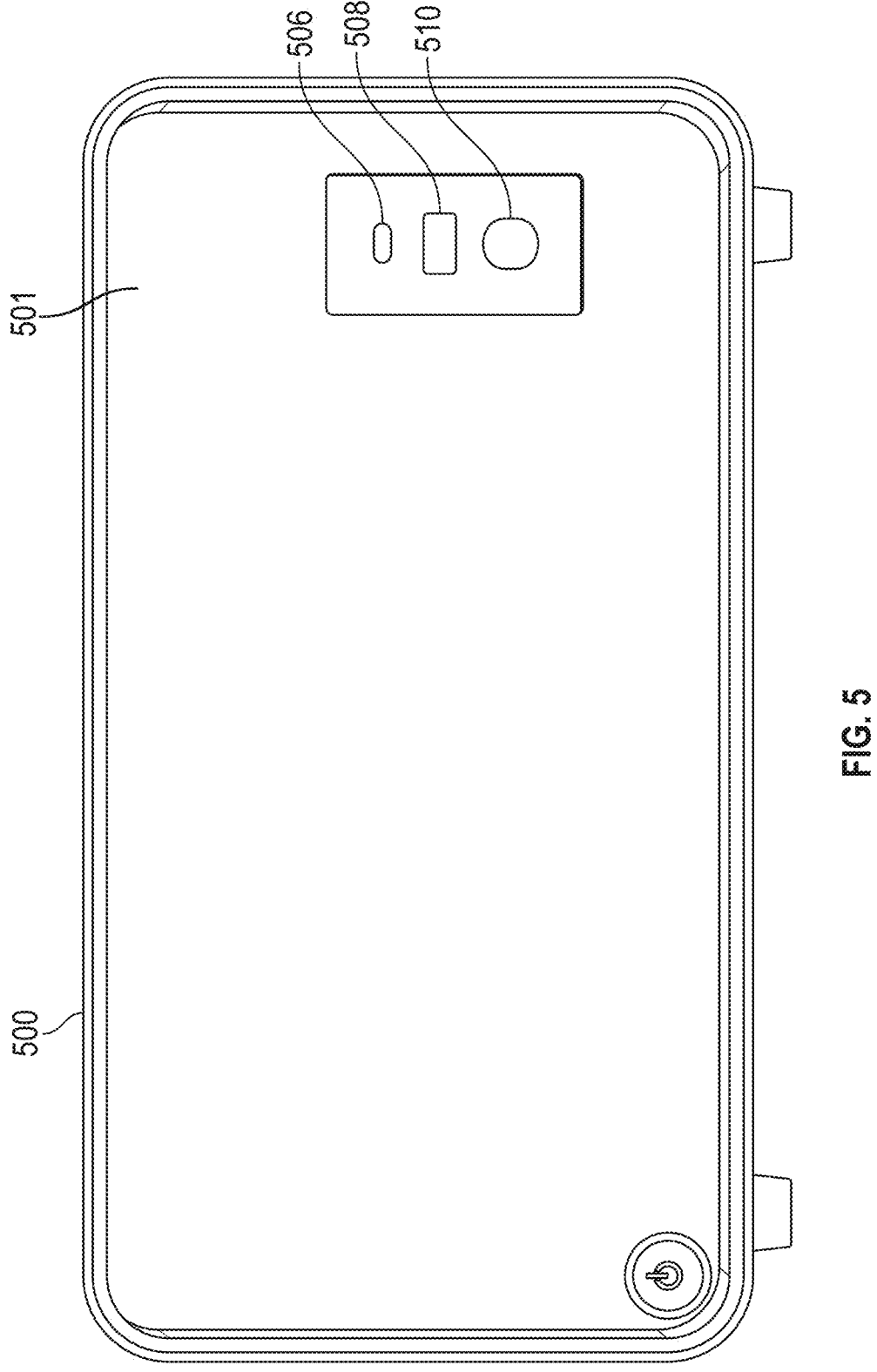
FIG. 5 illustrates an exemplary front view of an exemplary central device for processing surgical video data associated with a surgery, according to examples of the disclosure.

FIG. 5 illustrates an exemplary front view of an exemplary central device 500 for processing surgical video data associated with a surgery. The central device 500 may be the central device 402 in FIG. 4. With reference to FIG. 5, the central device 500 comprises a housing 501 for enclosing one or more components for processing surgical video data associated with the surgery (e.g., one or more components of system 200 in FIG. 2). Enclosed in the housing 501 can be a programmable circuit configured to receive the surgical video data from a camera control unit (e.g., programmable circuit 202 in FIG. 2) and a processor communicatively coupled with the programmable circuit and configured to execute a plurality of instructions for processing the video data stored on a memory (e.g., processing system 222 in FIG. 2). The processor may include a graphics processing unit ("GPU"), a central processing unit ("CPU"), an AI inferencing unit, or any combination thereof. The housing 501 may enclose a motherboard comprising a USB host.

With reference to FIG. 5, a plurality of USB connectors, including a first connector 506, a second connector 508, and a third connector 510, are exposed on the housing 501 for connecting to a plurality of peripheral devices such as those described above with reference to FIG. 4. These USB connectors include at least one non-galvanically-isolated USB connector (e.g., the first connector 506 and the second connector 508) and at least one galvanically-isolated USB connector (e.g., the third connector 510). The at least one galvanically-isolated USB connector (e.g., the third connector 510) is configured to be connected to a surgical device for contact with a patient during the surgery. These USB connectors may enable connections between the motherboard of central device 500 and the receptacle board of the peripheral devices.

Figure 6:
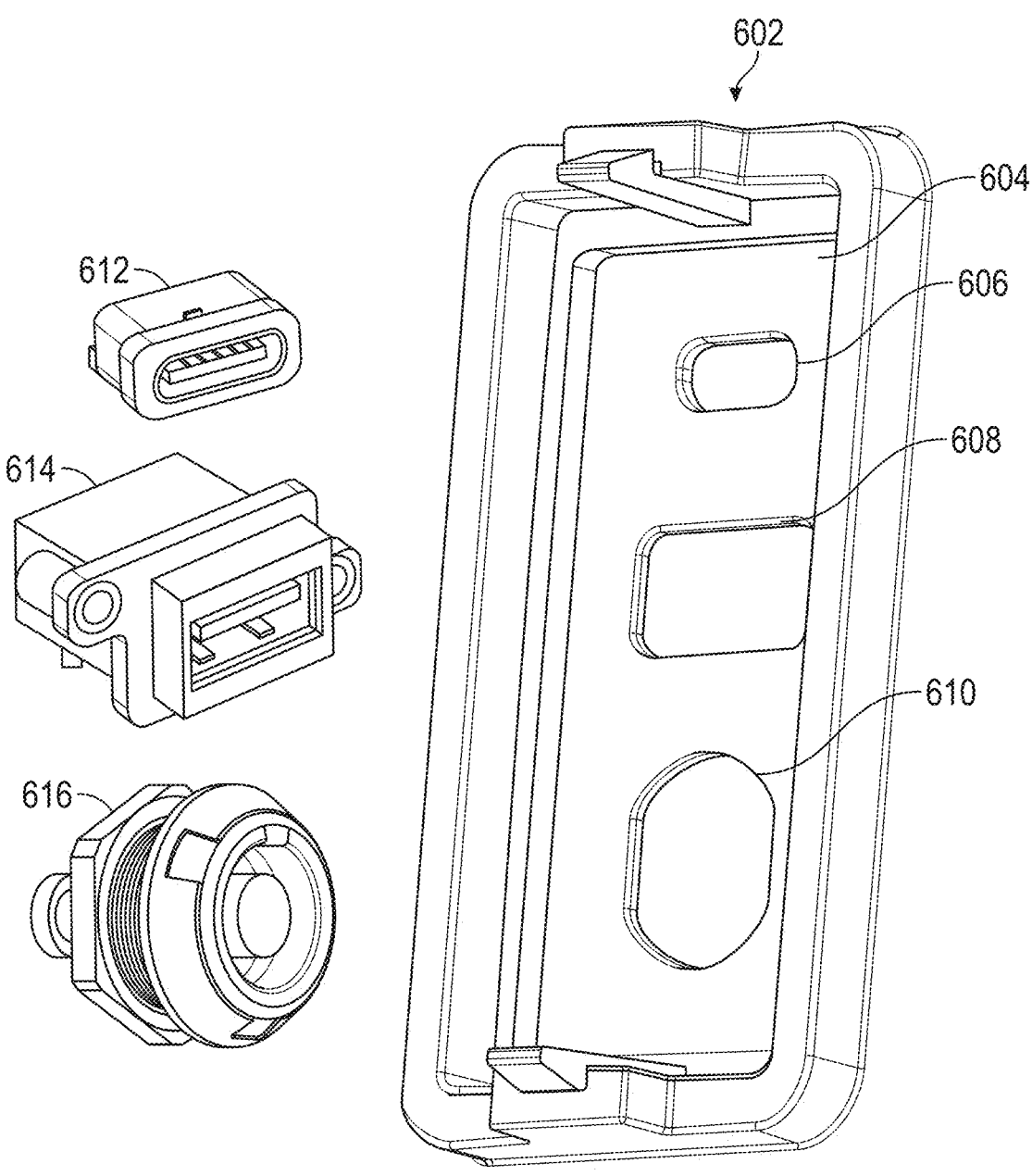
FIG. 6 illustrates a perspective view of a portion of an exemplary housing of an exemplary central device for processing surgical video data associated with a surgery, according to examples of the disclosure.

FIG. 6 illustrates a detailed perspective view of a portion 602 of a housing of a central device for processing surgical video data associated with a surgery. The central device may be the central device 402 in FIG. 4 or the central device 500 in FIG. 5. With reference to FIG. 6, a plurality of openings 606, 608, and 610 on the housing are used to expose a plurality of USB connectors, such as the USB connectors 612, 614, and 616. The plurality of USB connectors is configured to allow connection to a plurality of peripheral devices such as those described herein. To improve durability of the system, each of the plurality of USB connectors may include one or more receptable boards with sacrificial connectors, electrostatic-discharge (ESD) protection circuitry, common-mode emissions suppression circuitry, or some combination thereof.

In the depicted example, the connectors 612 and 614 are non-galvanically-isolated USB connectors. They may comprise a USB 3.x Type C connector or a USB 3.x Type A connector and may be configured to connect to a device that is not meant to be in contact with the patient's body, such as a storage device, a printer, an input device, an output device, a camera, or any combination thereof. For example, non-galvanically-isolated USB connectors 612 and 614 may be configured to connect to the touch screen interface 408, the C-arm 414, the C-arm capture device 416, the printer 422, and/or the external storage device 424 in FIG. 4.

Further, the connector 616 is a galvanically-isolated USB connector and is configured to be connected to a surgical device for contact with a patient during surgery (e.g., pointer device 410 in FIG. 4). The surgical devices may be configured to contact with a patient during surgery internally (e.g., into a surgical site) or externally (e.g., touching/moving across the patient's skin). Exemplary surgical devices can include: a pointer device for taking internal measurements, a device for measuring pressure, a device for measuring temperature, an ultrasound detector, an imager, or any combination thereof.

The galvanically-isolated USB connector may include an isolation circuit which comprises a USB digital isolator, an isolated DC-to-DC converter, or a combination thereof. The USB digital isolator may be a full/low speed digital isolator. The isolation circuit may include one or more transformers. Accordingly, when connected to a surgical device that is contact with a patient, the galvanically-isolated USB connector isolates the surgical device from other electrical signals of the central device, thereby protecting the patient from being electrically shocked. The galvanically-isolated USB connector may be configured to provide a power line, a ground line, and one or more signal transmission lines with the surgical device. In some examples, the at least one galvanically-isolated USB connector comprises a USB 2.0 or a USB 3.0 connector. Optionally, the at least one galvanically-isolated USB connector may comprise a USB protocol wire run into a medical grade connector, such as a Body-Floating (BF) rated connector. Optionally, the at least one galvanically-isolated USB connector may be configured to operate in accordance with a serial or I²C protocol.

Accordingly, the galvanically-isolated USB connector 616 shields the connected surgical device from other electrical signals running through the central device and reduces the risk of the patient being shocked during the surgical procedure. As shown in FIG. 6, the galvanically-isolated connector is structurally distinct from the non-galvanically-isolated connectors to reduce the risk of a surgical device being connected to a non-galvanically-isolated connector by mistake.

The disclosure will now be further described by the following numbered embodiments which are to be read in connection with the preceding paragraphs, and which do not limit the disclosure. The features, options and preferences as described above apply also to the following embodiments.

1. A system for generating a video of a surgery, comprising:
   a processor configured to execute a plurality of instructions for a machine-learning model stored on a memory;
   a programmable circuit communicatively coupled with the processor, wherein the programmable circuit is programmed to:
      receive surgical video data comprising a current frame;
      provide data related to the current frame to the processor;
      receive overlay data generated by the machine-learning model based on a previous frame captured before the current frame;
      generate, by a mixer of the programmable circuit, a composite frame based on the current frame and the overlay data; and
      output the composite frame for display as a part of the video of the surgery.

2. The system of Embodiment 1, wherein the programmable circuit comprises a field programmable gate array ("FPGA").
3. The system of Embodiment 1, wherein the processor comprises a graphics processing unit ("GPU"), a central processing unit ("CPU"), an AI inferencing unit, or any combination thereof.
4. The system of Embodiment 1, wherein the system is associated with an operating room.
5. The system of Embodiment 4, wherein the surgical video data is captured by a camera in the operating room.
6. The system of Embodiment 5, wherein the camera in the operating room is an endoscopic camera, a PTZ camera, an exoscope camera, a boom light camera, a fluoroscope camera, or a microscope camera.
7. The system of any of Embodiments 1-6, wherein the machine-learning model is configured to identify one or more objects of interest in an input frame and output one or more graphical overlays indicating the one or more objects of interest.
8. The system of any of Embodiments 1-6, wherein the machine-learning model is configured to identify a measurement associated with two points of interest in an input frame and output a numeric overlay indicating the measurement.
9. The system of any of Embodiments 1-6, wherein the machine-learning model is configured to identify a medical recommendation based on an input frame and output a textual overlay indicating the recommendation.
10. The system of any of Embodiments 1-9, wherein the programmable circuit is configured to: after receiving the current frame, generate, using a splitter of the programmable circuit, a copy of the current frame.
11. The system of Embodiment 10, wherein the programmable circuit is further configured to: perform one or more preprocessing operations on the copy of the current frame to obtain the data provided to the processor.
12. The system of Embodiment 11, wherein the one or more preprocessing operations comprise resizing the current frame.
13. The system of Embodiment 11, wherein the one or more preprocessing operations comprise cropping the current frame.
14. The system of Embodiment 11, wherein the one or more preprocessing operations comprise changing color of the current frame.
15. The system of Embodiment 14, wherein changing the color of the current frame comprises converting the current frame to a different color space.
16. The system of Embodiment 11, wherein the one or more preprocessing operations comprise generating an algebraic object based on the current frame.
17. The system of Embodiment 16, wherein the algebraic object comprises a Tensor object.
18. The system of Embodiment 11, wherein the one or more preprocessing operations comprise normalizing the current frame.
19. The system of any of Embodiments 1-18, wherein the programmable circuit is further configured to: upon receiving the current frame, if no overlay data is available for the mixer to generate the composite frame, output the current frame for display.

20. The system of any of Embodiments 1-19, wherein the overlay data is associated with a predefined display location, wherein the system is further configured to:

determine a new display location for the overlay data based on the surgical video data; and generate the composite frame by adding the overlay data to the current frame based on the new display location.

21. The system of Embodiment 20, wherein the programmable circuit is further configured to:

if a difference between the predefined display location and the new display location exceeds a threshold, forego generating the composite frame.

22. The system of any of Embodiments 1-21, wherein the programmable circuit is further configured to: upon receiving the current frame, if no overlay data is available for the mixer to generate the composite frame:

generate a projected overlay based on one or more previous overlays; and generate, by the mixer of the programmable circuit, the composite frame based on the current frame and the projected overlay.

23. The system of any of Embodiments 1-22, wherein the system comprises a direct memory access ("DMA") controller configured to request data from a memory associated with the processor.

24. The system of Embodiment 23, wherein the DMA controller is configured to transfer the requested data received from the memory associated with the processor to a video scan-out format.

25. The system of Embodiment 24, wherein the video scan-out format comprises the High-Definition Multimedia Interface ("HDMI"), the DisplayPort interface, the serial digital interface ("SDI"), or any combination thereof.

26. The system of Embodiment 23, wherein the DMA controller is configured to request the data from the memory associated with the processor as needed without buffering more than ¼ of a full frame.

27. The system of any of Embodiments 1-22, wherein the programmable circuit comprises a DMA controller configured to request the overlay data from a memory associated with the processor.

28. The system of Embodiment 27, wherein the DMA controller is configured to transfer the overlay data received from the memory associated with the processor to the mixer.

29. The system of Embodiment 28, wherein the mixer is configured to receive the overlay data from the DMA controller and combine the received overlay data with the current frame to generate the composite frame.

30. The system of Embodiment 27, wherein the DMA controller is configured to request the overlay data from the memory associated with the processor as needed without buffering more than ¼ of a full frame.

31. The system of Embodiment 27, wherein the mixer is configured to request, from the DMA controller, a pixel of the overlay data before receiving a corresponding pixel in the current frame.

32. The system of any of Embodiments 1-31, wherein the processor is further configured to:

provide an input frame to the machine-learning model to obtain an output overlay; and provide the output overlay to the programmable circuit.

33. The system of any of Embodiments 1-32, wherein the system is configured to:

receive a first request associated with a first application to execute the machine-learning model to process an input frame;

execute, by the processor, the machine-learning model to obtain an output based on the input frame;

receive a second request associated with a second application to execute the machine-learning model to process the input frame;

upon determining that the first request and the second request are directed to the same machine-learning model, forego re-executing the machine-learning model by the processor based on the second request.

34. The system of Embodiment 33, wherein the machine-learning model is associated with a unique identifier.

35. A method for generating a video of a surgery, comprising:

receiving, by a programmable circuit, surgical video data comprising a current frame;

providing, by the programmable circuit, data related to the current frame to a processor communicatively coupled with the programmable circuit, wherein the processor is configured to execute a plurality of instructions for a machine-learning model stored on a memory;

receiving, by the programmable circuit, overlay data generated by the machine-learning model based on a previous frame captured before the current frame;

generating, by a mixer of the programmable circuit, a composite frame based on the current frame and the overlay data; and outputting, by the programmable circuit, the composite frame for display as a part of the video of the surgery.

36. The method of Embodiment 35, wherein the programmable circuit comprises a field programmable gate array ("FPGA").

37. The method of Embodiment 35, wherein the processor comprises a graphics processing unit ("GPU"), a central processing unit ("CPU"), an AI inferencing unit, or any combination thereof.

38. The method of Embodiment 35, wherein the programmable circuit is associated with an operating room.

39. The method of Embodiment 38, wherein the surgical video data is captured by a camera in the operating room.

40. The method of Embodiment 39, wherein the camera in the operating room is an endoscopic camera, a PTZ camera, an exoscope camera, a boom light camera, a fluoroscope camera, or a microscope camera.

41. The method of any of Embodiments 35-40, wherein the machine-learning model is configured to identify one or more objects of interest in an input frame and output one or more graphical overlays indicating the one or more objects of interest.

42. The method of any of Embodiments 35-40, wherein the machine-learning model is configured to identify a measurement associated with two points of interest in an input frame and output a numeric overlay indicating the measurement.

43. The method of any of Embodiments 35-40, wherein the machine-learning model is configured to identify a medical recommendation based on an input frame and output a textual overlay indicating the recommendation.

44. The method of any of Embodiments 35-43, wherein the method further comprises: after receiving the current frame, generating, using a splitter of the programmable circuit, a copy of the current frame.

45. The method of Embodiment 44, wherein the method further comprises: performing, by the programmable circuit, one or more preprocessing operations on the copy of the current frame to obtain the data provided to the processor.

46. The method of Embodiment 45, wherein the one or more preprocessing operations comprise resizing the current frame.

47. The method of Embodiment 45, wherein the one or more preprocessing operations comprise cropping the current frame.

48. The method of Embodiment 45, wherein the one or more preprocessing operations comprise changing color of the current frame.

49. The method of Embodiment 48, wherein changing the color of the current frame comprises converting the current frame to a different color space.

50. The method of Embodiment 45, wherein the one or more preprocessing operations comprise generating an algebraic object based on the current frame.

51. The method of Embodiment 50, wherein the algebraic object comprises a Tensor object.

52. The method of Embodiment 45, wherein the one or more preprocessing operations comprise normalizing the current frame.

53. The method of any of Embodiments 35-50, wherein the method further comprises: upon receiving the current frame, if no overlay data is available for the mixer to generate the composite frame, outputting, by the programmable circuit, the current frame for display.

54. The method of any of Embodiments 35-53, wherein the overlay data is associated with a predefined display location, wherein the method further comprises: determining a new display location for the overlay data based on the surgical video data; and generating the composite frame by adding the overlay data to the current frame based on the new display location.

55. The method of Embodiment 54, wherein the method further comprises: if a difference between the predefined display location and the new display location exceeds a threshold, foregoing, by the programmable circuit, generating the composite frame.

56. The method of any of Embodiments 35-55, wherein the method further comprises: upon receiving the current frame, if no overlay data is available for the mixer to generate the composite frame: generating, by the programmable circuit, a projected overlay based on one or more previous overlays; and generating, by the mixer of the programmable circuit, the composite frame based on the current frame and the projected overlay.

57. The method of any of Embodiments 35-56, wherein the method further comprises requesting, by a direct memory access ("DMA") controller, data from a memory associated with the processor.

58. The method of Embodiment 57, wherein the method further comprises transferring, by the DMA controller, the requested data received from the memory associated with the processor to a video scan-out format.

59. The method of Embodiment 58, wherein the video scan-out format comprises the High-Definition Multimedia Interface ("HDMI"), the DisplayPort interface, the serial digital interface ("SDI"), or any combination thereof.

60. The method of Embodiment 59, wherein the method further comprises requesting, by the DMA controller, the data from the memory associated with the processor as needed without buffering more than ¼ of a full frame.

61. The method of any of Embodiments 35-56, wherein the programmable circuit comprises a DMA controller configured to request the overlay data from a memory associated with the processor.

62. The method of Embodiment 61, wherein the method further comprises transferring, by the DMA controller, the overlay data received from the memory associated with the processor to the mixer.

63. The method of Embodiment 62, wherein the method further comprises receiving, by the mixer, the overlay data from the DMA controller and combining the received overlay data with the current frame to generate the composite frame.

64. The method of Embodiment 61, further comprising requesting, by the DMA controller, the overlay data from the memory associated with the processor as needed without buffering more than ¼ of a full frame.

65. The method of Embodiment 61, further comprising requesting, by the mixer, a pixel of the overlay data from the DMA controller before receiving a corresponding pixel in the current frame.

66. The method of any of Embodiments 35-65, further comprising: providing, by the processor, an input frame to the machine-learning model to obtain an output overlay; and providing, by the processor, the output overlay to the programmable circuit.

67. The method of any of Embodiments 35-66, further comprising: receiving a first request associated with a first application to execute the machine-learning model to process an input frame; executing, by the processor, the machine-learning model to obtain an output based on the input frame; receiving a second request associated with a second application to execute the machine-learning model to process the input frame; upon determining that the first request and the second request are directed to the same machine-learning model, foregoing re-executing the machine-learning model by the processor based on the second request.

68. The method of Embodiment 67, wherein the machine-learning model is associated with a unique identifier.

69. A non-transitory computer-readable storage medium storing one or more programs, the one or more programs comprising instructions, which when executed by one or more processors of a system, cause the system to perform the method of any one of Embodiments 35-68.

70. A computer program product comprising instructions which, when the program is executed by a system according to any one of Embodiments 1-34, cause the system to carry out the method of any one of Embodiments 35-68.

71. A device for processing surgical video data associated with a surgery, comprising: a housing; a programmable circuit enclosed in the housing configured to receive the surgical video data from a camera control unit;

a processor enclosed in the housing, wherein the processor is communicatively coupled with the programmable circuit and is configured to execute a plurality of instructions for processing the video data stored on a memory;

a plurality of Universal Serial Bus (USB) connectors exposed on the housing, wherein the plurality of USB connectors is configured to connect to a plurality of peripheral devices, the plurality of USB connectors comprising:

at least one non-galvanically-isolated USB connector; and at least one galvanically-isolated USB connector configured to be connected to a surgical device for contact with a patient during the surgery.

72. The device of Embodiment 71, wherein the surgical device comprises: a pointer device, a measurement device, an ultrasound detector, an imager, or any combination thereof.

73. The device of any one of Embodiments 71-72, wherein the at least one galvanically-isolated USB connector comprises a USB 2.0 connector or a USB 3.0 connector.

74. The device of any one of Embodiments 71-73, wherein the at least one galvanically-isolated USB connector comprises a USB digital isolator, an isolated DC-to-DC converter, or a combination thereof.

75. The device of any one of Embodiments 71-74, wherein the at least one galvanically-isolated USB connector is configured to provide a power line, a ground line, and one or more signal transmission lines with the surgical device.

76. The device of any one of Embodiments 71-75, wherein the at least one non-galvanically-isolated USB connector comprises a USB 3.x Type C connector or a USB 3.x Type A connector.

77. The device of any one of Embodiments 71-76, wherein the at least one non-galvanically-isolated USB connector is configured to connect to a storage device, a printer, an input device, an output device, a camera, or any combination thereof.

78. The device of any one of Embodiments 71-77, wherein the processor comprises a graphics processing unit ("GPU"), a central processing unit ("CPU"), an AI inferencing unit, or any combination thereof.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

What is claimed is:

1. A system for generating a video of a surgery, comprising:

a processor configured to execute a plurality of instructions for a machine-learning model stored on a memory;

a programmable circuit communicatively coupled with the processor, wherein the programmable circuit is programmed to:

receive surgical video data comprising a current frame that was captured at time t;

provide data related to the current frame to the processor;

receive first overlay data generated by the machine-learning model based on a previous frame that was captured before the current frame at time t' before time t;

generate, by a mixer of the programmable circuit, a composite frame based on the current frame and the first overlay data generated by the machine-learning model based on the previous frame;

after starting to generate the composite frame based on the current frame and the first overlay data, receive second overlay data generated by the machine-learning model based on the current frame; and output the composite frame for display as a part of the video of the surgery.

2. The system of claim 1, wherein the programmable circuit comprises a field programmable gate array ("FPGA").

3. The system of claim 1, wherein the processor comprises a graphics processing unit ("GPU"), a central processing unit ("CPU"), an AI inferencing unit, or any combination thereof.

4. The system of claim 1, wherein the system is associated with an operating room.

5. The system of claim 4, wherein the surgical video data is captured by a camera in the operating room.

6. The system of claim 5, wherein the camera in the operating room is an endoscopic camera, a PTZ camera, an exoscope camera, a boom light camera, a fluoroscope camera, or a microscope camera.

7. The system of claim 1, wherein the machine-learning model is configured to identify one or more objects of interest in an input frame and output one or more graphical overlays indicating the one or more objects of interest.

8. The system of claim 1, wherein the machine-learning model is configured to identify a measurement associated with two points of interest in an input frame and output a numeric overlay indicating the measurement.

9. The system of claim 1, wherein the machine-learning model is configured to identify a medical recommendation based on an input frame and output a textual overlay indicating the recommendation.

10. The system of claim 1, wherein the programmable circuit is configured to: after receiving the current frame, generate, using a splitter of the programmable circuit, a copy of the current frame.

11. The system of claim 10, wherein the programmable circuit is further configured to: perform one or more preprocessing operations on the copy of the current frame to obtain the data provided to the processor.

12. The system of claim 11, wherein the one or more preprocessing operations comprise resizing the current frame.

13. The system of claim 11, wherein the one or more preprocessing operations comprise cropping the current frame.

14. The system of claim 11, wherein the one or more preprocessing operations comprise changing color of the current frame.

15. The system of claim 14, wherein changing the color of the current frame comprises converting the current frame to a different color space.

16. The system of claim 11, wherein the one or more preprocessing operations comprise generating an algebraic object based on the current frame.

17. The system of claim 16, wherein the algebraic object comprises a Tensor object.

18. The system of claim 11, wherein the one or more preprocessing operations comprise normalizing the current frame.

19. The system of claim 1, wherein the programmable circuit is further configured to: upon receiving the current frame, if no overlay data is available for the mixer to generate the composite frame, output the current frame for display.

20. The system of claim 1, wherein the overlay data is associated with a predefined display location, wherein the system is further configured to:
determine a new display location for the overlay data based on the surgical video data; and
generate the composite frame by adding the overlay data to the current frame based on the new display location.

21. The system of claim 20, wherein the programmable circuit is further configured to:
if a difference between the predefined display location and the new display location exceeds a threshold, forego generating the composite frame.

22. The system of claim 1, wherein the programmable circuit is further configured to: upon receiving the current frame, if no overlay data is available for the mixer to generate the composite frame:
generate a projected overlay based on one or more previous overlays; and
generate, by the mixer of the programmable circuit, the composite frame based on the current frame and the projected overlay.

23. The system of claim 1, wherein the system comprises a direct memory access ("DMA") controller configured to request data from a memory associated with the processor.

24. The system of claim 23, wherein the DMA controller is configured to transfer the requested data received from the memory associated with the processor to a video scan-out format.

25. The system of claim 24, wherein the video scan-out format comprises the High-Definition Multimedia Interface ("HDMI"), the DisplayPort interface, the serial digital interface ("SDI"), or any combination thereof.

26. The system of claim 23, wherein the DMA controller is configured to request the data from the memory associated with the processor as needed without buffering more than ¼ of a full frame.

27. The system of claim 1, wherein the programmable circuit comprises a DMA controller configured to request the overlay data from a memory associated with the processor.

28. The system of claim 27, wherein the DMA controller is configured to transfer the overlay data received from the memory associated with the processor to the mixer.

29. The system of claim 28, wherein the mixer is configured to receive the overlay data from the DMA controller and combine the received overlay data with the current frame to generate the composite frame.

30. The system of claim 27, wherein the DMA controller is configured to request the overlay data from the memory associated with the processor as needed without buffering more than ¼ of a full frame.

31. The system of claim 27, wherein the mixer is configured to request, from the DMA controller, a pixel of the overlay data before receiving a corresponding pixel in the current frame.

32. The system of claim 1, wherein the processor is further configured to:
provide an input frame to the machine-learning model to obtain an output overlay; and
provide the output overlay to the programmable circuit.

33. The system of claim 1, wherein the system is configured to:
receive a first request associated with a first application to execute the machine-learning model to process an input frame;
execute, by the processor, the machine-learning model to obtain an output based on the input frame;
receive a second request associated with a second application to execute the machine-learning model to process the input frame;
upon determining that the first request and the second request are directed to the same machine-learning model, forego re-executing the machine-learning model by the processor based on the second request.

34. The system of claim 33, wherein the machine-learning model is associated with a unique identifier.

35. A method for generating a video of a surgery, comprising:
receiving, by a programmable circuit, surgical video data comprising a current frame that was captured at time t;
providing, by the programmable circuit, data related to the current frame to a processor communicatively coupled with the programmable circuit, wherein the processor is configured to execute a plurality of instructions for a machine-learning model stored on a memory;
receiving, by the programmable circuit, first overlay data generated by the machine-learning model based on a previous frame that was captured before the current frame at time t' before time t;
generating, by a mixer of the programmable circuit, a composite frame based on the current frame and the first overlay data generated by the machine-learning model based on the previous frame;
after starting to generate the composite frame based on the current frame and the first overlay data, receiving second overlay data generated by the machine-learning model based on the current frame; and
outputting, by the programmable circuit, the composite frame for display as a part of the video of the surgery.

* * * * *